United States Patent [19]
Ward et al.

[11] Patent Number: 4,800,314
[45] Date of Patent: Jan. 24, 1989

[54] DEEP BEAM SUPPORT ARRANGEMENT FOR DYNAMOELECTRIC MACHINE STATOR COIL END PORTIONS

[75] Inventors: Robert T. Ward, Winter Park; John M. Butler, Orlando, both of Fla.

[73] Assignee: Westinghouse Electric Corp., Pittsburgh, Pa.

[21] Appl. No.: 92,851

[22] Filed: Aug. 24, 1987

[51] Int. Cl.$^4$ .............................................. H02K 3/46
[52] U.S. Cl. ..................... 310/260; 310/271
[58] Field of Search ............. 310/260, 271, 254, 180, 310/194, 91, 208, 214, 51, 270

[56] References Cited

U.S. PATENT DOCUMENTS

| | | | |
|---|---|---|---|
| 3,344,296 | 9/1967 | Coggeshall | 310/271 |
| 3,949,256 | 4/1976 | Cooper | 310/260 |
| 3,949,257 | 4/1976 | Cooper | 310/260 |
| 4,315,173 | 2/1982 | Calfo | 310/260 |
| 4,379,243 | 4/1983 | Dailey | 310/260 |
| 4,488,079 | 12/1984 | Dailey | 310/260 |
| 4,563,607 | 1/1986 | Cooper et al. | |

Primary Examiner—R. Skudy
Attorney, Agent, or Firm—D. C. Abeles

[57] ABSTRACT

A coil support arrangement for use in connection with a dynamoelectric machine equipped with a stator having top and bottom winding coil end portions arranged in phase groups and extending outwardly from the stator at each end thereof. The support arrangement consists of a support ring encircling the bottom winding coil end portions, blocking means providing lateral support for the coil end portions to restrain vibrational movement of the latter during machine operation and a series of bands for holding the coil end portions of the phase group, the related blocking means and the support ring together, with the blocking means disposed in axial alignment with the ring to thereby present a single blocked and banded, elongated phase group structure which extends circumferentially around the inside of the ring. The blocking means consists of a plurality of individual block elements which extend the full radial depth of the phase group structure to provide deep beam strength characteristics to the structure. The block elements are generally trapezoidal in shape to facilitate wedging of the same between adjacent coil end portions during assembly. A wedging mechanism is provided between adjacent phase group structures for applying circumferentially directed tightening forces to the overall arrangement.

18 Claims, 2 Drawing Sheets

DEEP BEAM SUPPORT ARRANGEMENT FOR DYNAMOELECTRIC MACHINE STATOR COIL END PORTIONS

BACKGROUND OF THE INVENTION

1. Field of the Invention

This invention relates to dynamoelectric machine end turn support arrangements.

2. Description of the Prior Art

There has in the past been and there continues to be a need for improving the bracing of the end turn portions of the winding coils extending from the ends of the stators of dynamoelectric machines such as large turbine generators. Manifestly, the stresses imposed during operation, particularly those caused by vibration, result in wear of coil insulation and fatigue cracking of series and copper strand phase connections. Many proposals have been made in the past in an effort to solve this long standing problem and examples of prior arrangements are illustrated in U.S. Pat. Nos. 3,949,256; 3,949,257; 4,379,243; and 4,488,079, the entireties of the disclosures of which are hereby specifically incorporated herein by reference.

The increasing use of four pole machines has exacerbated the problem as a result of the natural vibrational phenomena encountered with such machines. The present invention is aimed at the provision of a more rigid end turn structure which resists such vibrational tendencies.

SUMMARY OF THE INVENTION

To eleviate the prior art problems discussed above, the present invention provides a coil support arrangement for use in connection with a dynamoelectric machine equipped with a stator having top and bottom winding coil end portions extending outwardly from the stator at each end thereof. In such machines the coil end portions are generally arranged in phase groups. The support arrangement comprises a support ring encircling the bottom winding coil end portions; respective end blocking means providing lateral support for the coil end portions of each phase group to restrain vibrational movement of the latter during machine operation; and means for holding the coil end portions of a phase group, the respective end blocking means and the support ring together with the blocking means disposed in axial alignment with the ring, to thereby present a single, blocked, elongated phase group structure which extends circumferentially around the inside of the ring. In accordance with the invention, the blocking means comprises a plurality of individual block elements which extend the full radial depth of the phase group structure to provide deep beam strength characteristics to the structure.

In a preferred form of the invention the holding means comprises banding means extending longitudinally of the structure across the top surfaces of the top coil end portions, down each end of the structure and around the ring at each end of the structure. Preferably the holding means comprises cross banding means extending laterally around the structure and over the longitudinal banding means for tightening the latter by pulling it down to the top of the structure. In a particularly preferred form of the invention, a full depth block element is positioned at each end of the structure and at least one additional full depth block element is positioned centrally of the structure. Ideally, the additional full depth block element should be trapezoidal in shape to facilitate wedging of the same between adjacent top coil end portions and adjacent bottom coil portions.

In practical form, the coil support arrangement of the present invention comprises a plurality of blocked and banded phase group structure disposed in side-by-side relationship around the supporting ring with wedge means disposed between the ends of adjacent structures for applying circumferentially direct tightening forces to the overall arrangement.

The invention also provides an improved dynamoelectric machine which includes the novel support arrangement outlined above.

DESCRIPTION OF THE PREFERRED EMBODIMENTS

Figure 1:
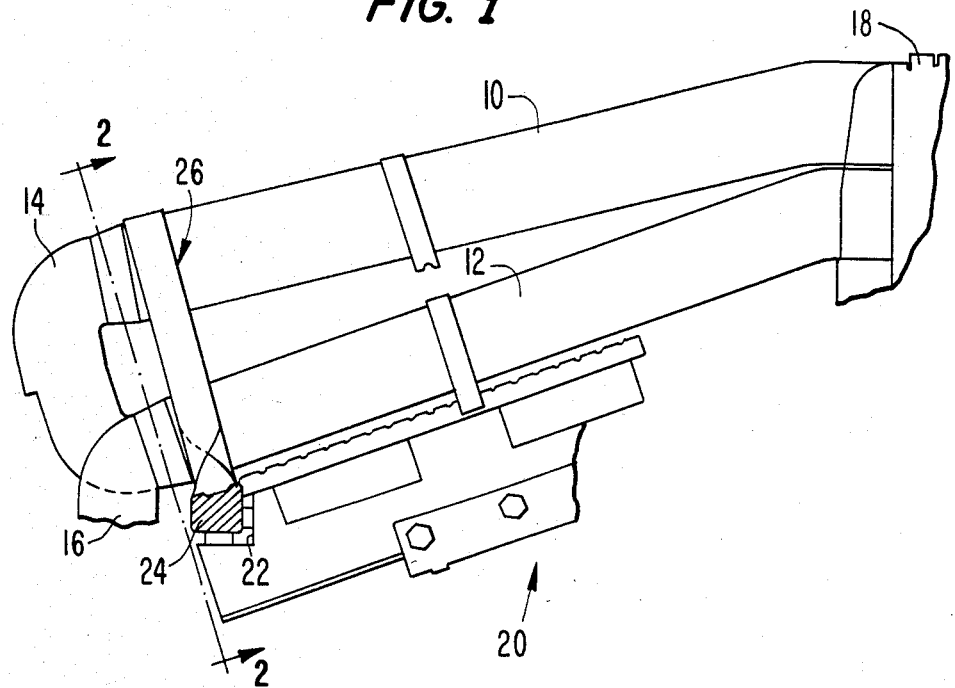
FIG. 1 is a side view of a stator coil end turn assembly at the excitor end of a dynamoelectric machine which incorporates a coil support arrangement in accordance with the concepts and principles of the present invention.

The winding coil end portions of a stator for a dynamoelectric machine, in this case a large turbine generator, are illustrated in FIG. 1 where a top coil end portion is identified by the reference numeral 10, a bottom coil end portion is identified by the reference numeral 12 and a series connection for interconnecting a top coil end portion 10 and a bottom coil 12 is identified by reference numeral 14. Also illustrated in FIG. 1 is a phase lead 16 for carrying current from the end of the stator winding in a manner which is well known. Top coil end portion 10 and bottom coil end portion 12 extend outwardly from the end of the stator 18, only a small portion of which is shown.

As is well known to those working in the dynamoelectric machine field, stator 18 and the end portions of the coils, which is conventionally referred to as the diamond area, are annular and define a bore for the rotor. Traditionally in the dynamoelectric machine art, the winding coil which is closest to the center of rotation of the rotor is referred to as a top coil while the coil element which is furtherest from the center of rotation of the rotor is referred to as the bottom coil. Thus, FIG. 1 is a cross-sectional elevation view taken essentially at the lower end of the end turn or diamond area of the machine.

A series of support elements designated broadly by the reference numeral 20 are spaced around the end of stator 18. Each element 20 has a notched portion at its outboard end 22 for supporting a support ring 24 which extends around the entire diamond area of the machine and encircles bottom winding coil end portions 12. The elements 20 are conventional and provide support for ring 24 in a manner which is known per se.

As will be appreciated by those skilled in the dynamoelectric machine art, FIG. 1 is not a true cross-sectional view since it is well known that bottom coil end portions 12 have a throw in one direction while top coil end portions 10 have a throw in the opposite direction providing a cross-hatched, diamond-shaped appearance. Moreover, at the left hand end of the view, structure has been removed so as to provide an essential elevational view of one end of a phase group structure 26 constructed in accordance with the present invention.

Figure 2:
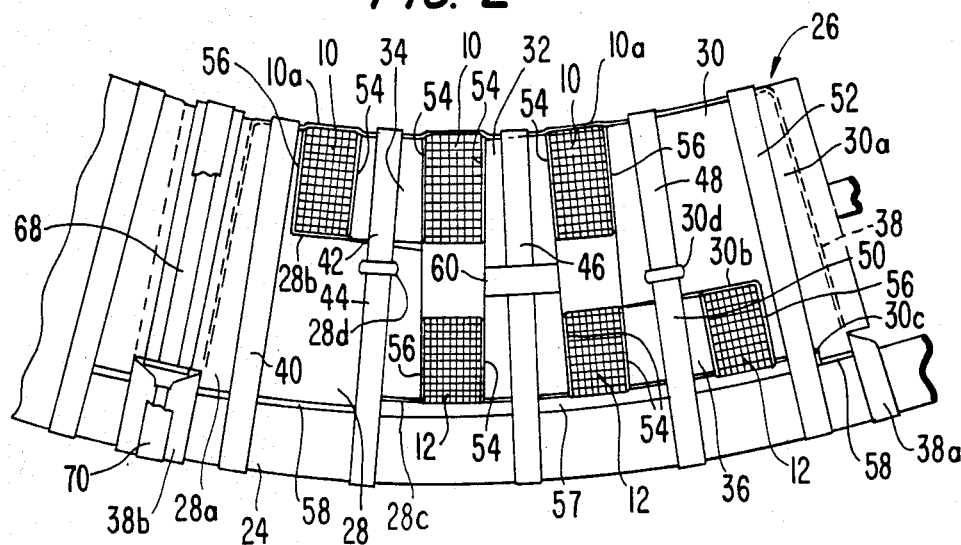
FIG. 2 is a sectional view taken along the line 2—2 of FIG. 1.

The construction of structure 26 can best be seen with reference to FIG. 2. Structure 26 includes a complete phase group, in this case consisting of three top coil end portions 10 and three bottom coil end portions 12. The right hand most bottom coil end portion 12 is connected to a phase lead 16 as illustrated in FIG. 1 and the left hand most top end portion 10 is connected similarly to a phase lead which is not shown in the drawings. As can be seen viewing FIG. 2, the coil end portions which are connected to the phase leads are offset in a conventional manner from the other coils of the phase group.

Structure 26 includes end blocking means consisting of phase blocks 28 and 30 and series blocks 32, 34 and 36. As can be seen viewing FIG. 2, block 32 extends essentially for the full radial depth of structure 26, from ring 24 to a position essentially in alignment with top surfaces 10a of top coil end portions 10. Likewise the left hand portion 28a of block 28 and the right hand portion 30a of block 30 extend essentially for the full radial depth of structure 26. Block 32 is trapezodial in shape to facilitate the arcuate shape of structure 26 which, as can be seen viewing FIG. 2, is elongated and extends circumferentially of ring 24. The trapezodial shape of block 32 also facilitates the insertion of the same by wedging between adjacent top coil end portions 10 and adjacent bottom coil end portions 12 during the assembly of phase group structure 26.

Means in the nature of phase group banding 38 and cross bands 40 through 52 is provided for holding the coil end portions 10 and 12 of a phase group, the related end blocks 28 through 36 and support ring 24 together to present a block phase group structure 26. As can be seen viewing FIG. 1, structure 26 is disposed essentially in axial alignment with ring 24.

Banding 38 extends longitudinally of structure 26 across the top surfaces 10a of top coil end portions 10, down the opposite sides of structure 26 and around ring 24. As can be seen in FIG. 2, portions 38a and 38b of band 38 are rotated approximately 90° to facilitate passage around ring 24.

During the assembly of structure 26, series blocks 32, 34 and 36 are driven between the corresponding coil end portions 10 and 12. In this regard, it should be noted that series block 34 is a short series block and is disposed between two adjacent top coil end portions 10, whereas series block 36, which is also a short series block, is disposed between a pair of adjacent bottom coil end portions 12. On the other hand, block 32 extends for the full depth of the structure and is disposed between two adjacent top coil end portions 10 and also between two adjacent bottom coil end portions 12. Thus, as can clearly be seen in FIG. 2, block 32 is wedged between a pair of circumferentially spaced top coil end portions 10 and also between a pair of circumferentially spaced bottom coil end portions 12.

Prior to wedging blocks 32, 34 and 36 into position, the same are preferably wrapped in a conventional manner with a piece of dacron felt material 54 which has been filled with a thixotropic thermosetting, curable resin. Blocks 32, 34 and 36 are placed in axial alignment with ring 24 and a resin filled dacron spacer 57 is interposed between ring 24 and the bottom surfaces of coil end portions 12 and blocks 32 and 36. The phase blocks 28 and 30 are positioned as shown in FIG. 2 with a piece of resin impregnated dacron felt 56 disposed between each block and the adjacent top or bottom coil end portion 10 or 12 as the case may be. Block 28 is provided with a shelf 28b to accommodate the left hand top coil portion 10 and block 34 while block 30 is provided with a similar shelf 30b for accommodating the right hand bottom coil portion 12 and block 36. Notches 28c and 30c are provided to accommodate dacron spacer 57 as shown.

After all of the blocks and impregnated felt members are in position, the banding 38 is wrapped around the entire group structure 26. The band at this stage is simply hand tightened and preferably as many as five layers of banding may be applied. The banding preferably consists of a polyester glass resin filled band material of a sort which is commonly utilized for such purposes. After each layer of banding is in place the same may conveniently be brushed with a curable resin material. At this stage it may be convenient to place, dacron felt spacer members 58 between phase blocks 28 and 30 respectively and ring 24.

As initially installed, band 38 will extend in a straight line from the top right hand corner to the top left hand corner of structure 26 due to the arcuate configuration of the top surfaces 10a of top coil end portions 10 and the top surfaces of the blocks 28, 30, 32 and 34. Cross banding 40 through 52 is now applied as shown. This banding is the same as the banding 38 and again five layers is desirable. Note that holes 28d and 30d are provided in blocks 28 and 30 respectively so that the band at that location can be applied in half sections. That is to say, band 42 goes from opening 28d up and around block 34 and back through hole 28d. Conversely, band 44 goes through hole 28d down and around ring 24 and back up through 28d. The same applies to bands 48 and 50 in the hole 30d.

Bands 40, 46 and 52 go all the way around ring 24 and up and around bands 38 and down again around ring 24. The bands 40, 42, 46, 48 and 52 are pulled tightly, one point at a time, to pull band 38 down against the top surface of structure 26 and thereby tighten band 38. Cinch banding 60 may be used to further support and tighten particularly band 46 as shown. Band 60 may preferably be of the same material and application as other banding described above. In this regard, it should be noted that cinch banding 60 need not go all the way around the block as is shown, but rather holes may be provided in the blocks where desirable to facilitate banding.

After all of the resin material utilized in the spacers and bands has appropriately hardened and cured, the structure 26 will function as a single beam having deep beam strength characteristics by virtue of the fact that blocks 28, 30 and 32 extend for the full radial depth of the structure. Moreover, in the completed structure 26, blocks 28 through 36 provide lateral support for the coil end portions to restrain vibrational movement during machine operation.

Figure 3:
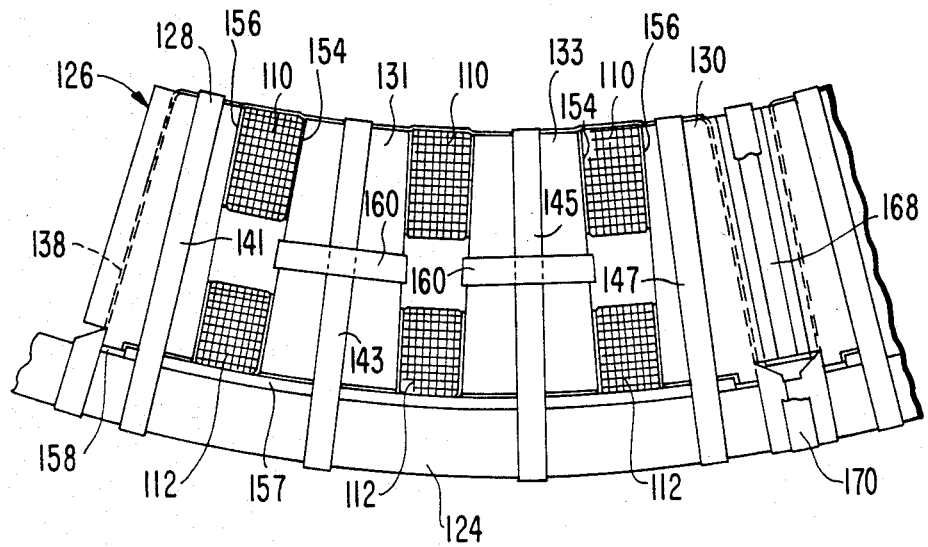
FIG. 3 is a cross-sectional view similar to FIG. 2 except of the opposite end of the stator.

The blocking and banding at the turbine end of the stator is illustrated in FIG. 3, where structure which is essentially the same as in FIG. 2 has been identified with a reference numeral in the 100 series. Thus, ring 124 in FIG. 3 is essentially the same and serves the same purpose as ring 24 in FIG. 2. The principle difference between the turbine end and the excitor end is that at the former, each top end portion 10 is aligned with a bottom end portion 12 and thus, short series blocks such as the blocks 34 and 36 and intricately configured group blocks such as the blocks 28 and 30 are not required. Rather, at the turbine end all of the blocks extend for the full radial extent of the structure 126. Thus, the end blocking means at the turbine end consists of series blocks 131 and 133 and phase blocks 128 and 130. In each case, each block provides lateral support for both a top and a bottom coil end portion as shown. Otherwise, the blocked, elongated phase group structure 126 which extends circumferentially of ring 124 at the turbine end of the stator is the same as the blocked, elongated phase group structure 26 which extends circumferentially of ring 24 at the excitor end of the stator. That is to say, structure 126 includes group banding 138, cross banding 141, 143, 145 and 147 and cinch banding 160. Similarly, structure 126 includes impregnated felt members 154 and 156 as well as spacers 157 and 158.

Figure 4:
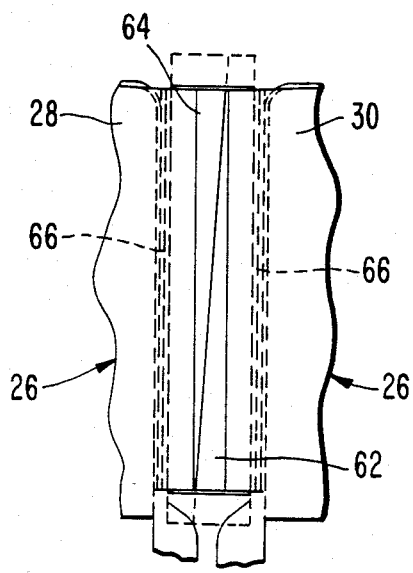
FIG. 4 is a detail view of wedge means in position between adjacent group structures for tightening the overall assembly.

After the structures 26 and 126 have been completed at respective opposite ends of the stator, the entire assemblage may be tightened as illustrated in FIG. 4. FIG. 4 is a detailed view showing the construction at the excitor end of the stator between adjacent structures 26. This structure includes opposed wedges 62 and 64 which are driven between the phase block 28 on one structure 26 and the phase block 30 on the facing end of the adjacent structure 26. Preferably resin impregnated dacron felt members 66 may be interposed between the wedges and the adjacent surfaces of the structures 26. After assemblage the wedges may be banded with a band 68 (See FIG. 2) which extends only around the wedges themselves. Then an external band 70 may be employed to extend around the top of the wedges and down around ring 24, again as shown in FIG. 2. The construction at the turbine end for tightening structures 126 is identical with that illustrated in FIG. 4.

The blocks 28 through 36, 128, 130, 131 and 133 may be constructed of any material which has sufficient stiffness and other physical characteristics to withstand the conditions in the machine. It has been found, in accordance with the present invention, that an epoxy laminate material is preferable. Such materials are well known in the dynamoelectric machine art and the same may be machined and hand fitted as necessary. This is particularly desirable since the dimensions of the coils and between the coils at the diamond area are not precise. This is also true of the resin filled dacron felt members which provide bases between the blocks and the coil and between the blocks and the support ring. The thicknesses of such members may need to be adjusted from case to case to appropriately provide the necessary support. It has been found that a desirable structure is provided if the dacron felt members are compressed to approximately 50% of their original thickness after the installation is complete.

It has been found, in accordance with the present invention, and by virtue of the blocks which extend for the full radial depth of the group structures 26 and 126, that each structure acts as though it were a solid, stiff deep beam structure. Thus, the structure is much more resistive of vibrational tendencies than prior structures.

We claim:

1. A coil support arrangement for use in connection with a dynamoelectric machine equipped with a stator having top and bottom winding coil end portions extending outwardly from the stator at each end thereof, said coil end portions being arranged in phase groups, said support arrangement comprising:
   a support ring encircling the bottom winding coil end portions;
   respective end blocking means providing lateral support for the coil end portions of each phase group to restrain vibrational movement of the coil end portions during machine operation; and
   banding means encircling the coil end portions of a phase group, said respective end blocking means and said support ring for holding the coil end portions, the blocking means and the support ring together, with the blocking means disposed in axial alignment with the ring, to thereby present a single, blocked, elongated phase group structure which extends circumferentially around the inside of the ring,
   said blocking means comprising a plurality of individual block elements which are disposed in axial alignment with the ring and which extend the full radial depth of the phase group structure to provide deep beam strength characteristics to the structure.

2. A coil support arrangement as set forth in claim 1 wherein the top winding coil end portions have top surfaces and said banding means comprises a banding element extending longitudinally of the structure across the top surfaces of the top winding coil end portions, down each end of the structure and around the ring at each end of the structure.

3. A coil support arrangement as set forth in claim 2 wherein said banding means comprises cross banding means extending laterally around the structure and over the longitudinal banding element for tightening the latter by pulling it down to the top of the structure.

4. A coil support arrangement as set forth in claim 1 wherein a respective one of said block elements which extend the full radial depth of the phase group structure is positioned at each end of the structure and at least one additional block element which extends the full radial depth of the phase group structure is positioned centrally of the structure.

5. A coil support arrangement as set forth in claim 4 wherein said additional block element is generally trapezoidal in shape and is wedged between a pair of circumferentially spaced top winidng coil end portions and a pair of circumferentially spaced bottom winding coil end portions.

6. A coil support arrangement as set forth in claim 4 wherein the top winding coil end portions have top surfaces and said banding means comprises a banding element extending longitudinally of the structure across the top surfaces of the top winding coil end portions, down each end of the structure and around the ring at each end of the structure.

7. A coil support arrangement as set forth in claim 6 wherein said banding means comprises cross banding means extending laterally around the structure and over the longitudinal banding element for tightening the latter by pulling it down to the top of the structure.

8. A coil support arrangement as set forth in claim 7 wherein said additional block element is generally trapezoidal in shape and is wedged between a pair of circumferentially spaced top winding coil end portions and a pair of circumferentially spaced bottom winding coil end portions.

9. A coil support arrangement as set forth in claim 1 which comprises a plurality of phase group structures disposed in side-by-side relationship around said supporting ring, arrangement further comprising wedge means disposed between the ends of adjacent structures for applying circumferentially directed tightening forces to the overall arrangement.

10. A dynamoelectric machine comprising a stator having top and bottom winding coil end portions extending outwardly therefrom at each end thereof, said coil end portions being arranged in phase groups and being supported at each end of the machine by a support arrangement comprising:

a support ring encircling the bottom winding coil end portions;

respective end blocking means providing lateral support for the coil end portions of each phase group to restrain vibrational movement of the coil end portions during machine operation; and banding means encircling the coil end portions of a phase group, said respective end blocking means and said support ring for holding the coil end portions, the blocking means and the support ring together, with the blocking means disposed in axial alignment with the ring, to thereby present a single, blocked, elongated phase group structure which extends circumferentially around the inside of the ring, said blocking means comprising a plurality of individual block elements which are disposed in axial alignment with the ring and which extend the full radial depth of the phase group structure to provide deep beam strength characteristics to the structure.

11. A dynamoelectric machine as set forth in claim 10 wherein the top winding coil end portions have top surfaces and said banding means comprises a banding element extending longitudinally of the structure across the top surfaces of the top winding coil end portions, down each end of the structure and around the ring at each end of the structure.

12. A dynamoelectric machine as set forth in claim 11 wherein said banding means comprises cross banding means extending laterally around the structure and over the longitudinal banding element for tightening the latter by pulling it down to the top of the structure.

13. A dynamoelectric machine as set forth in claim 10 wherein a respective one of said block elements which extend the full radial depth of the phase group structure is positioned at each end of the structure and at least one additional block element which extends the full radial depth of the phase group structure is positioned centrally of the structure.

14. A dynamoelectric machine as set forth in claim 13 wherein said additional block element is generally trapezoidal in shape and is wedged between a pair of circumferentially spaced top coil end portions and a pair of circumferentially spaced bottom coil end portions.

15. A dynamoelectric machine as set forth in claim 13 wherein the top winding coil end portions have top surfaces and said banding means comprises a banding element extending longitudinally of the structure across the top surfaces of the top winding coil end portions, down each end of the structure and around the ring at each end of the structure.

16. A dynamoelectric machine as set forth in claim 15 wherein said banding means comprises cross banding means extending laterally around the structure and over the longitudinal banding element for tightening the latter by pulling it down to the top of the structure.

17. A dynamoelectric machine as set forth in claim 16 wherein said additional block element is generally trapezoidal in shape and is wedged between a pair of circumferentially spaced top winding coil end portions and a pair of circumferentially spaced bottom winding coil end portions.

18. A dynamoelectric machine as set forth in claim 10 wherein each support arrangement comprises a plurality of phase group structures disposed in side-by-side relationship around said supporting ring, said arrangements further comprising wedge means disposed between the ends of adjacent structures for applying circumferentially directed tightening forces to the overall arrangement.

* * * * *